United States Patent

Schwert et al.

[11] Patent Number: 6,050,300
[45] Date of Patent: Apr. 18, 2000

[54] METHOD AND AN APPARATUS FOR LINING A PIPE OR DUCT

[75] Inventors: Siegfried Schwert; André Rose; Andreas Hüttemann; Peter Marquardt; Wolf Rabold, all of Berlin, Germany

[73] Assignee: Karl Weiss Hoch-Tief - und Rohrleitungsbau GmbH & Co., Germany

[21] Appl. No.: 09/151,339

[22] Filed: Sep. 11, 1998

[51] Int. Cl.$^7$ .................................................. F16L 55/16
[52] U.S. Cl. .............................. 138/98; 138/97; 156/287; 156/294; 264/269
[58] Field of Search ................. 138/98, 97; 264/269, 264/36; 156/294, 287, 269, 94

[56] References Cited

U.S. PATENT DOCUMENTS

| | | | |
|---|---|---|---|
| 3,494,813 | 2/1970 | Lawrence et al. | 156/287 |
| 4,064,211 | 12/1977 | Wood | 156/287 X |
| 4,135,958 | 1/1979 | Wood | 156/199 |
| 4,334,943 | 6/1982 | Zenbayashi et al. | 138/98 X |
| 4,368,091 | 1/1983 | Ontsuga et al. | 138/98 X |
| 4,602,974 | 7/1986 | Wood et al. | 156/287 |
| 4,865,673 | 9/1989 | Shishkin et al. | 138/98 X |
| 4,883,557 | 11/1989 | Morinaga et al. | 138/98 X |
| 5,388,616 | 2/1995 | Muller et al. | 138/98 |
| 5,549,856 | 8/1996 | Yokoshima | 138/98 X |
| 5,680,885 | 10/1997 | Catallo | 138/98 |
| 5,765,597 | 6/1998 | Kiest, Jr. et al. | 138/98 |
| 5,937,910 | 8/1999 | Chandler | 138/98 X |

Primary Examiner—Patrick Brinson
Attorney, Agent, or Firm—Locke Reynolds LLP

[57] ABSTRACT

It is described a method for lining a pipe or a duct through an internal lining of a plastic coated flexible fabric tube adhering to the inner wall of the pipe by means of an adhesive. This method stands for the following steps:

filling a metered amount of adhesive into said flexible fabric tube in a uniform distribution over the flexible tube length, introducing said flexible fabric tube into the pipe, wherein one end of said flexible tube is fastened to the rear pipe end with respect to the moving direction, and the flexible tube using turning up is introduced into said pipe, and generating an internal pressure inside said introduced flexible fabric tube by means of supplied water for pressing said flexible tube against the inner wall of said pipe until the adhesive between said flexible tube and the inner wall of said pipe is cured. Here, the water is heated and cooled in controlled manner depending on the temperature values measured inside and outside the pipe for accelerating the curing operation.

With this, for different flexible tube diameters different sizes of the rotary drum are used, which include different wall thicknesses thus approximately having the same masses.

17 Claims, 5 Drawing Sheets

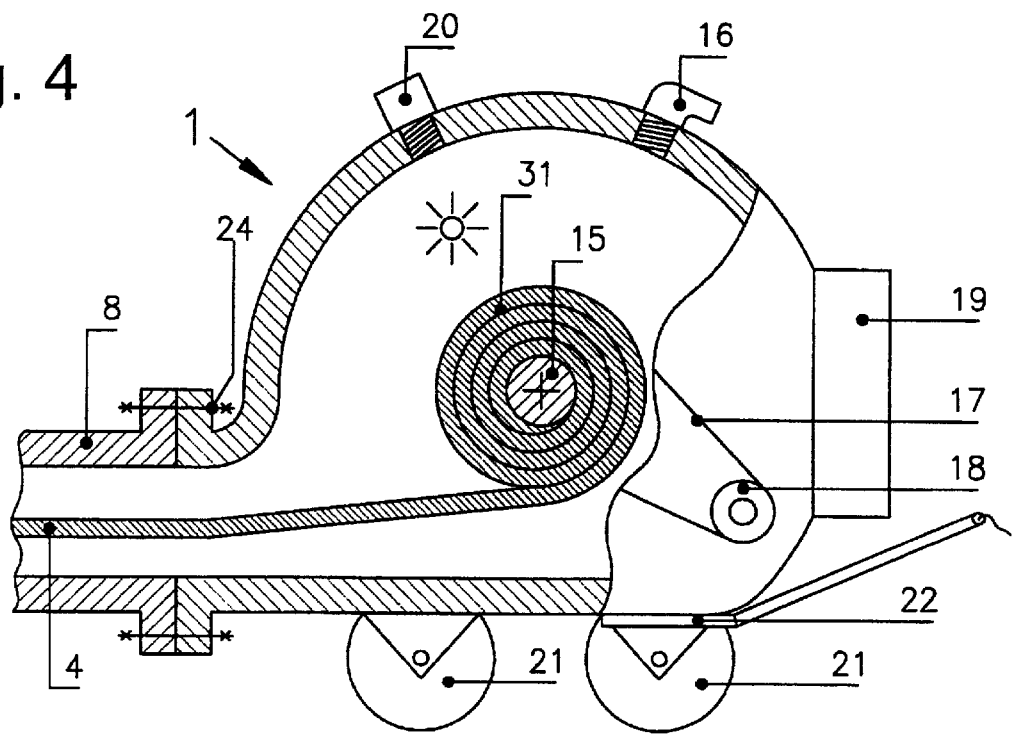
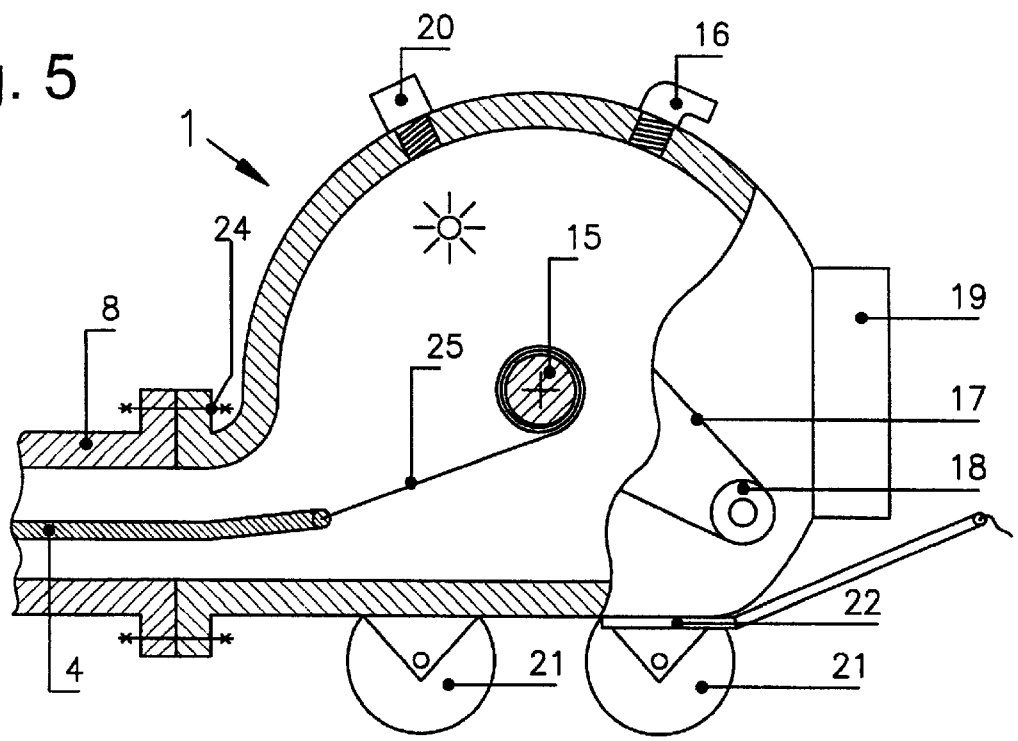

METHOD AND AN APPARATUS FOR LINING A PIPE OR DUCT

The invention relates to a method for redeveloping a pipe through a sealing internal lining of a plastic coated flexible fabric tube ahering to the inside of the pipe by means of an adhesive, as well as to an apparatus for performing the method.

A method for lining the inner surface of a pipe with flexible tubular lining material by using a liquid resin serving as an adhesive is disclosed in the U.S. Pat. No. 4,368,091. This method comprises the following steps:

a) annularly fixing one end of the lining material, which includes a liquid resin in the interior thereof, to one end of the pipe line,
b) applying a pressure with the aid of a pressure medium on said lining material such that said material is turned inside out at a turning point being formed past the fixing position such that said lining material moves into said pipe line and the turning point advances within the pipe line in the moving direction, wherein said lining material turned inside out is pressed with its surface coated with resin against the inner surface of the pipe line, and
c) maintaining the pressure by means of a pressure medium until the resin is cured.

By using a thermosetting resin, hot air or superheated steam under pressure can be led into the lining material to shorten the curing operation. With this, a separate source for supplying the hot air and superheated steam, respectively, is provided.

It has also been proposed to use heated water in place of heated compressed air, which is pressed into said tubular fabric pipe under sufficient pressure for accelerating the curing operation. The use of heated water is particularly advantageous, when the temperatures are only allowed to be restrictedly increased in order to avoid damages of the pipe. Thus, with bitumen coated pipes the temperature must not exceed 40° C. With steel pipes such too high temperatures may lead to a breakage of the welds.

However, the curing time depends on different external conditions, which are not readily detectable and cannot be readily considered thus existing a great uncertainty in this respect. For this reason, the possibly longest curing time is precautionarily selected such that in many cases this time is partly substantially longer than required.

After curing of the adhesive a hydraulic pressure test is to perform with the redeveloped pipe, which takes up longer time. When this hydraulic pressure test is previously performed during the cooling phase, thus substantial inaccuracies may occur. During the curing operation accelerated by the heated water, heat is dissipated into the ground encompassing the pipe as well such that the ground also heats. However, the degree of heating as well as the subsequent cooling of the ground depends on several factors such as thermal conductivity of the pipe as well as the nature and densitiy of the ground, such that the cooling operation also proceeds in uncontrolled manner. Hence, during this process a hydraulic pressure test cannot be performed, since cooling during the duration of the test results in a pressure drop with constant pipe volume as well. With an uncontrolled cooling, it may not be detected, whether a pressure drop is based on the cooling or leakage of the flexible fabric tube.

An uncontrolled water heating as well as an uncontrolled water cooling too may result in considerable temperature differences between the water in the interior of the pipe and the ground encompassing the pipe. Because of this, substantial mechanical stresses can take place based on thermal internal stresses such that for example adhering of the flexible fabric tube against the inner pipe wall is impaired.

Hence, it is the object of the present invention to improve the well-known method for lining a pipe or duct through a sealing internal lining of a plastic coated flexible tube ahering against the inner wall of the pipe by means of an adhesive such that the time required for lining can greatly be reduced and adhering the flexible tube to the inner pipe wall is not impaired by thermal stresses.

To solve this object a method is provided which comprises the following steps:

filling a metered amount of adhesive in a uniform distribution into said flexible tube throughout the flexible tube length,
introducing said flexible tube into the pipe, wherein one end of the flexible tube is secured to the rear end of the pipe with respect to the moving direction, and the flexible tube using turning up is introduced into the pipe, and
generating an internal pressure inside the introduced flexible tube by means of supplied water to press said flexible tube against the inner wall of the pipe, until the adhesive between the flexible tube and inner wall of the pipe is cured, wherein the water is heated and cooled in controlled manner to accelerate the curing process depending on the temperatures inside and outside the pipe.

As a result of controlled heating and cooling the water in the flexible tube depending on the temperatures inside and outside the pipe, the cooling phase can be individually performed for each pipe, such that the duration of this phase can be limited to each required length. Further, the hydraulic pressure test may be previously carried out during the cooling process, since cooling proceeds in controlled manner and thus the influence of cooling with respect to the pressure drop inside the flexible tube can be distinguished from a pressure drop due to a leakage. In addition, great temperature differences between the regions inside and outside the pipe as well as great temperature variations can be avoided by means of controlled heating and cooling, wherein the harmful influence of thermal stresses is stopped.

Preferably, the water is conducted within a circuit, in which the flexible tube and a heating/cooling device are placed. To possibly carry out uniformly heating and cooling, respectively throughout the length of the flexible tube, it is advantageous for the water both to be supplied and drained off only at one flexible tube end, wherein the water flows separated in space toward the opposite directions through the flexible tube. With this, an internal flexible tube can be used extending in the flexible tube in the longitudinal direction thereof, into which the water firstly streams in at one end and discharges at the other end thereof into said flexible tube, in order to return then to the one end in reverse current with respect to the flow inside the internal flexible tube, wherein it discharges from the flexible tube. The internal flexible tube can continuously be used as retaining belt which provides for a controlled movement of the flexible tube during introducing into the pipe.

The flexible tube being advanced under pressure into the pipe, is usually wound on a rotary drum. Hence, the drum casing is under pressure. The pressure required for turning up the flexible tube is different depending on the flexible tube diameter. Flexible tubes having a low diameter, provided an equal wall thickness, require higher pressures than flexible tubes having a great diameter.

This deems both for advancing the flexible tube into the pipe and for radial extending the flexible tube as well, which results in a proper adaption to the shape of the pipe. Among other things, this is the result of the force acting during the turning up operation for advancing the flexible tube is higher with the same pressure and flexible tube having greater diameter, since the pressure working surface is greater as well. Such forces being required for radially extending the flexible tube are in analogous manner. In addition, turning up operation is relatively easier with flexible tubes having a greater diameter, since the ratio of flexible tube wall thickness to diameter turns out more favourable.

Rotary drums according to the prior art are adapted for a very wide range of flexible tube diameters. Here, a problem is the great weight of the casing, which makes the transportation very difficult: The casing volume has to be dimensioned according to the maximum flexible tube diameter. On the other hand, the casing has also to comprise thick walls in order to withstand the high pressures, which are required with lining the flexible tubes having low diameter. Accordingly, such a thick walled construction having great volume comprises a very large mass. The unwinding device is generally firmly mounted on a lorry and hence comprises a greatly limited mobility such as in building sites.

The present invention is also based on the object to limit the mass of the rotary drum such that it is easy to handle and is mobile.

This object is solved according to the invention by the feature indicated in the characterizing portion of claim 1. Advantageous improvements of the unwinding device according to the invention result from the dependent claims.

As a result of determining the wall thickness of the casing depending on the flexible tube diameter such that the wall thickness decreases with increasing diameter, the respective rotary drum is only adapted to a particular diameter of the flexible tube and to a relatively low range of diameters, respectively. This results in separate arrangements of rotary drums to be configured for individual diameters, however with all arrangements having an approximately equal mass: small dimensioned casings having thicker walls for flexible tubes of low diameter and greater dimensioned ones having thinner walls for great diameters. Thereby, the weight of each of these different unwinding devices can be limited such that they may be independently transported by human force of one or two operators only.

Subsequently, the invention is explained in more detail according to embodiments with reference to the accompanying figures, in which:

FIG. 4 shows a rotary drum with partly unwound flexible tube and retaining belt;

FIG. 5 shows the rotary drum according to FIG. 4 with a completely unwound flexible tube.

Figure 1:
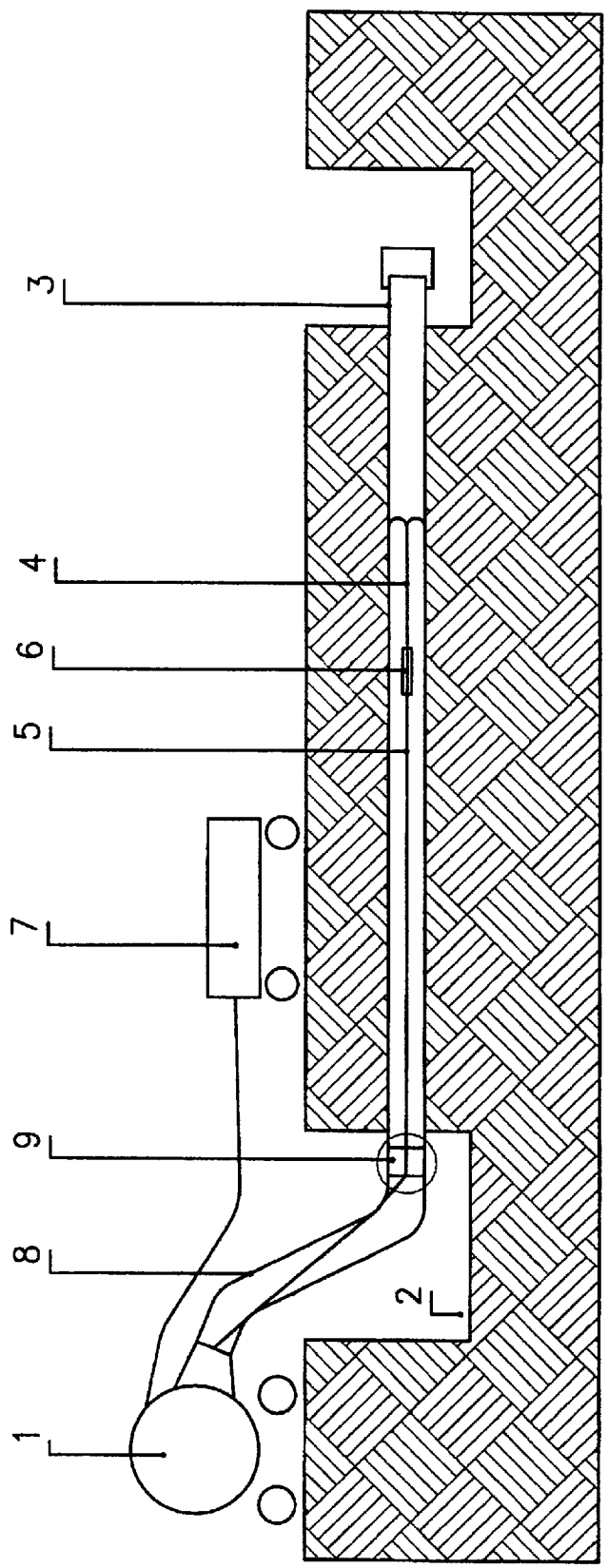
FIG. 1 shows the introducing operation of a flexible tube comprising a plastic coated fabric, for example, into a pipe to be redeveloped.
Figure 2:
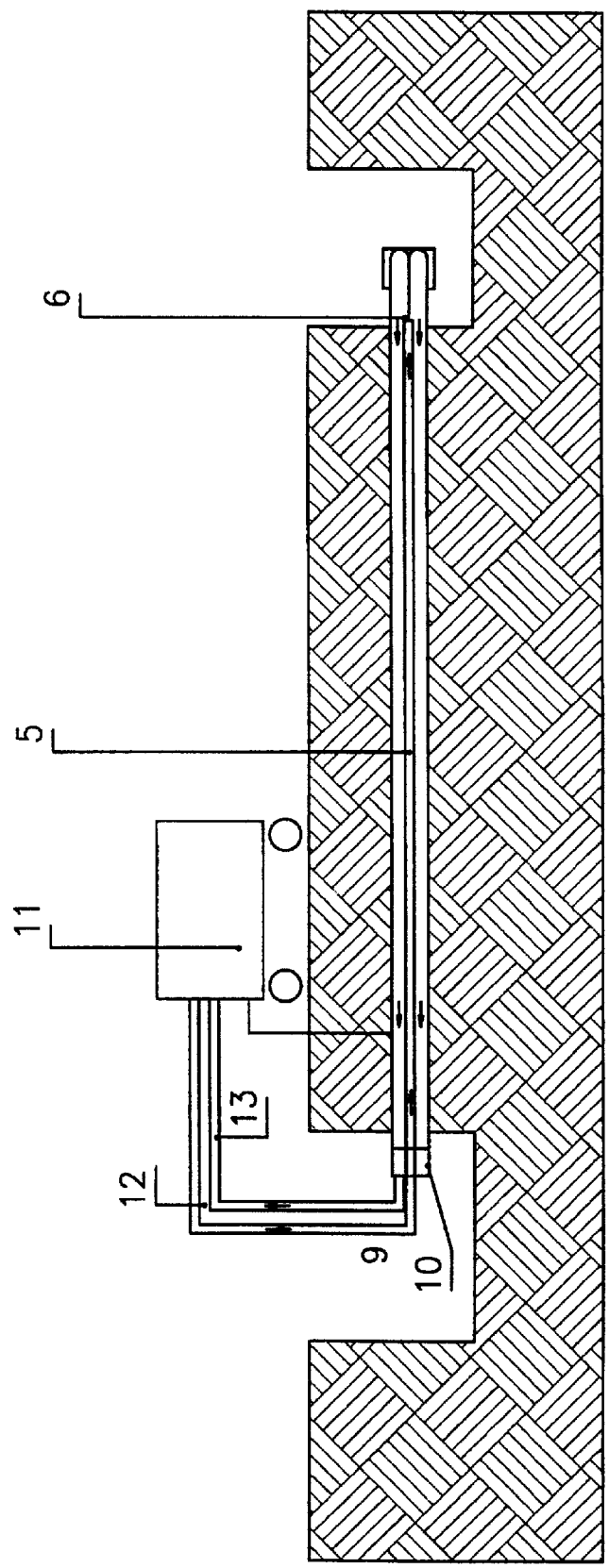
FIG. 2 shows the curing process of the adhesive layer between the external surface of the flexible tube and the inner surface of the pipe.

As shown in FIG. 1 a mobile rotary drum 1 is in an immediate proximity to an installing pit 2 for a pipe 3 to be redeveloped. Inside the rotary drum 1 is a plastic coated flexible fabric tube 4 being in the wound condition at the beginning of the redevelpoing operation, which flexible tube contains a metered amount of a heat curing adhesive in its interior. Moreover, the flexible fabric tube 4 is followed by a flexible tubular formed retaining belt 5 also being wound and having equal length. A fitting 6 between one end of the flexible fabric tube 4 and one end of the retaining belt 5 is formed such that in practice a flowable medium can freely flow from the retaining belt 5 into the flexible fabric tube 4 or vice versa. A mobile air compressor 7 is connected to the rotary drum 1 and generates inside thereof a pressure being increased with respect to the atmosphere.

A pressure sealed flexible tube conveyor 8 represents a pressure sealed connection between the rotary drum 1 and the end of the pipe 3 protruding into the installation pit 2.

At the start of the redeveloping operation, the begin of the flexible fabric tube 4 is drawn into the installation pit 2 to the end of the pipe 3 and is secured to the pipe terminal end in pressure sealed and annularly by means of a reversible head inside a flexible tube unit 9. Through the flexible tube conveyor 8 being subsequently coupled in a pressure sealed manner, the positive pressure inside the rotary drum 1 acts upon the closed end of the flexible fabric tube 4 such that this is pressed in a turning up manner inside the pipe 3. By this turning up operation the interior of the flexible fabric tube 4 is turned inside out such that the adhesive is now on the side of the flexible fabric tube 4 facing to the inner pipe wall. The retaining belt 5 ensures a controlled forward movement of the flexible fabric tube 4 under press-fitting, in order to endure the adhesive to be uniformly distributed between the flexible fabric tube 4 and pipe 3 and the flexible fabric tube 4 is forced against the pipe wall without any wrinkles.

After completion of the press-fitting operation, inside the installation pit 2 the flexible fabric tube 4 is squeezed off in a pressure sealed manner by means of a clamping device within the flexible tube unit 9, such that air pressure inside thereof is maintained. The flexible tube conveyor 8 is disconnected from the pipe terminal end such that the pressure drum 1, the air compressor 7 and the flexible tube conveyor 8 can be otherwise employed. Now, a black flange 10 is allowed to be connected to the flexible tube unit 9, which comprises passages for water supply and water discharge. These two passages are connected to a mobile compressed water source 11 on the outside of the black flange 10, with the source also including a water heating/cooling device as well as a control unit for the heating/cooling device. On the inside of the black flange 10 the passage for the water supply is connected to the interior of the flexible tube-type retaining belt 5, whereas the passage for the water discharge is connected to the interior of the flexible fabric tube 4. Hence, water being supplied from the compressed water source 11 is allowed to flow into the retaining belt 5, therethrough and via the fitting 6 into the flexible fabric tube 4 in the opposite direction therethrough and then back to the compressed water source 11 such that a circuit is formed.

In the water circuit is a temperature sensor 12 for the water flowing into the retaining belt 5 as well as a temperature sensor 13 for the water exiting the flexible fabric tube 4. From values measured by the temperature sensors 12 and 13 the mean temperature inside the flexible fabric tube 4 can be determined. Moreover, a temperature sensor 14 is provided which detects the temperature of the ground in close proximity of the pipe 3.

After connection of the retaining belt 5 and flexible fabric tube 4 to the compressed water source 11, firstly water having ambient temperature is pumped into the retaining belt 5, which displaces the compressed air therefrom and subsequently from the flexible fabric tube 4 as well. Then, compressed air can escape through a relief valve disposed at the highest position of the water circuit. The pressure of the water is approximately to correspond that of the compressed air. After the compressed air is entirely replaced by pressure water, heating operation for the water begins. According to the measured values of the three temperature sensors 12, 13 and 14 the temperature difference between the regions inside and outside the pipe 3 can be determined; moreover, it is allowed to determine which is the amount of the heat dissipation into the ground. According to the detected measured temperature values the heating/cooling device inside the compressed water source 11 may be controlled such that a desired temperature profile is maintained during the curing operation. This temperature profile is allowed to consider for example, that the temperature difference between regions inside and outside of the pipe 3 does not exceed a certain value.

Figure 3:
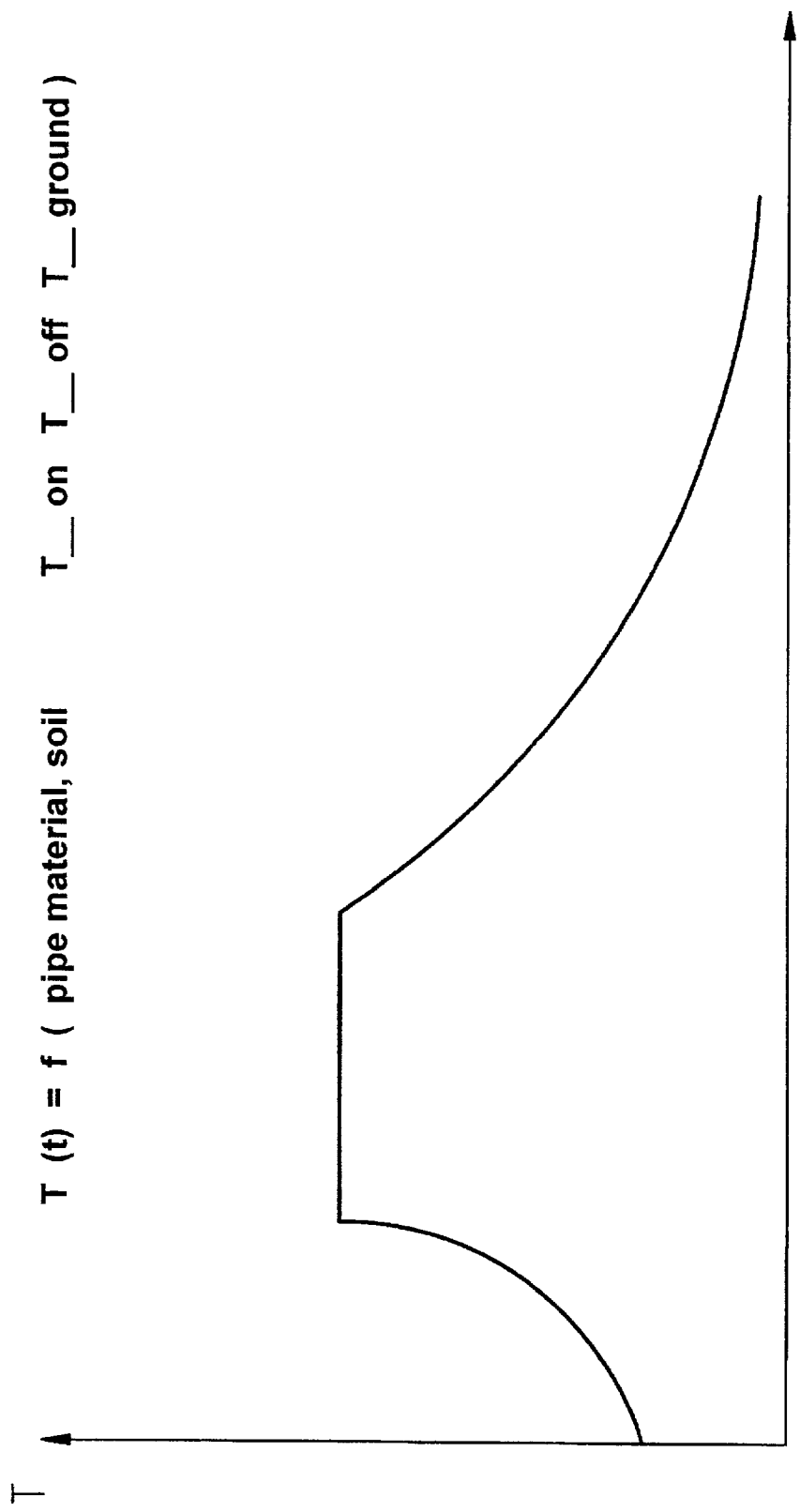
FIG. 3 shows a diagram of an exemplary march of temperature of the water during a curing process.

FIG. 3 shows an example for a temperature profile. This Fig. illustrates the march of temperature depending on the time in the interior of the pipe 3 during the curing operation. It is apparent therefrom, that the optimum march of temperature is not achieved by abruptly heating up and cooling, but this is given by a firstly slow temperature rise the accelerating to a maximum value, constantly keeping the temperature at this value and finally by a relatively slow cooling. Such optimum march of temperature can only be obtained by a function of the heating/cooling device controlled depending on measured temperature values.

FIG. 4 shows the rotary drum 1 including a shaft 15, on which the flexible fabric tube 4 being folded and inside filled with adhesive is wound.

The rotary drum 1 comprises a pressure port 16 for introducing a pressure medium. The shaft 15 being drivingly engaged with an electric motor 18 through a V-belt, which may brake or accelerate the shaft rotation. This is controlled by a control device 19 being in connection with a sensor 20 detecting operation parameters. Alternatively, it is also allowed to brake or accelerate with a crank handle and mechanical brake means not shown, respectively. Rolls 21 are provided to facilitate the transportation. A particularly advantageous configuration provides fixing the rolls 21 to a shaft, which is suspended on a swivelling bolster 22 having steering rods 23.

The rotary drum 1 comprises a plurality of windows not shown herein, which enable a better control of the operations. It also comprises an opening having a flange 24 which connects to the flexible tube conveyor 8 in pressure sealed manner.

FIG. 5 shows the rotary drum 1 at the end of the unwinding operation. The end of the flexible tube 4 is fastened to a retaining belt 25, which also occludes the flexible tube end in pressure sealed manner. The other end of the retaining belt is fastened to the shaft 15.

The direction of rotation of the electric motor 18 is reversible; in case of damage of the flexible fabric tube 4, because of this it is enabled the previously unwound portion of the flexible fabric tube 4 to be returned and wound up again during introducing inside the pipe 3.

By matching the wall thickness of the casing of the rotary drum 1 to the diameter of the flexible tube a reduced casing mass and hence improved mobility can be obtained. Pressure for press-fitting the flexible tubes varies according to the diameter from 0.1 bar (for very large flexible tubes) to $\leq 6$ bar (for very small flexible tubes). A plurality of different rotary drums are provided to meet such very wide ranges of size and pressure. These differ from each other with respect to the capacity and resistance to pressure, however, they all have a similiarly low mass.

Figure 6:
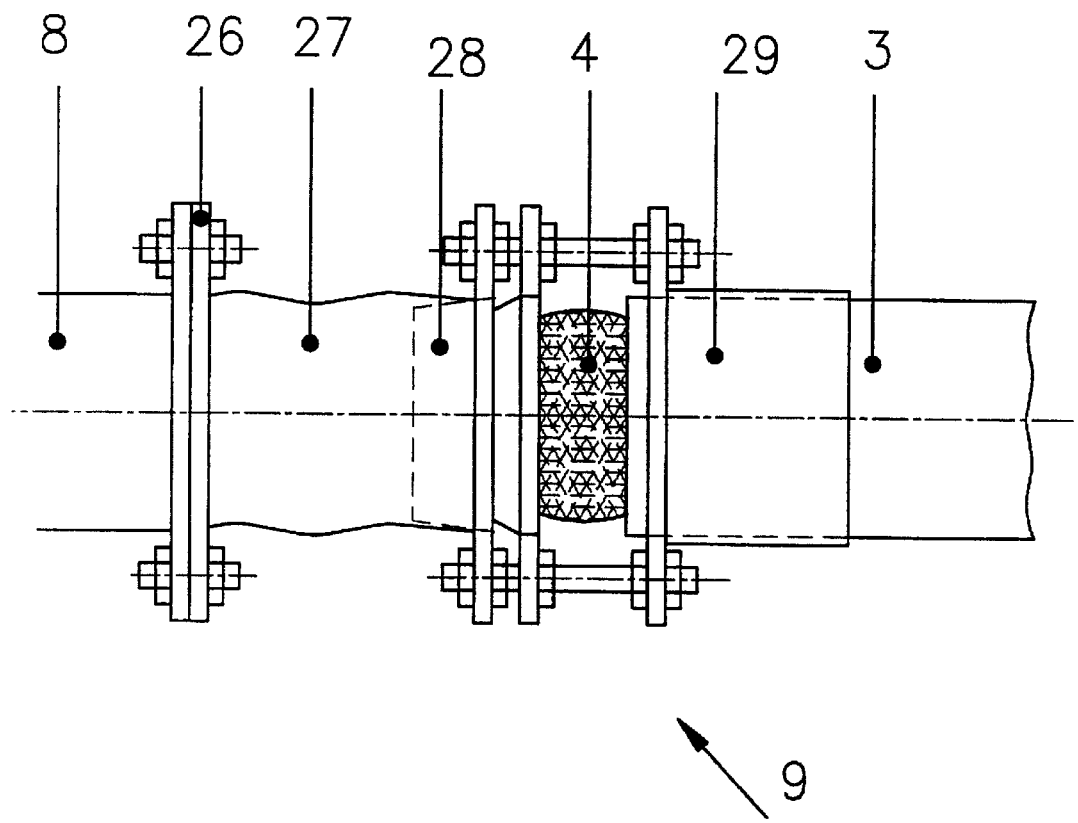
FIG. 6 shows the connecting region between the transporting flexible tube and the pipe to be lined.

In FIG. 6 the flexible tube unit 9 connecting the pipe 3 to the flexible tube conveyor 8 is shown in more detail. It comprises a connecting flange 26, followed by the flexible rubber tube 27, reversible head 28 and pipe fixture 29, which is secured to the pipe 3 to be lined. At the reversible head 28 the end of the flexible fabric tube 4 being firstly unwound from the rotary drum 1 is annularly secured such that the flexible fabric tube 4 being advanced into the pipe 3 by the pressure inside the rotary drum 1 is turned inside out at each most forward location. An inspection slit 30 is left open between the reversible head 28 and pipe fixture 29, through which it is allowed to observe, whether the flexible fabric tube 4, initially, has been properly advanced through the flexible tube conveyor. The flexible rubber tube 27 is high resilient such that in this position, after introducing into the pipe 3, the flexible fabric tube 4 can be squeezed off in airtight manner by means of an external clamping device disposed at the rear tube end.

The closed system so formed is not harmful to the environment, since an adhesive contamination of the environment is avoided. The flexible tube conveyor 8 also prevents possible damages of the flexible fabric tube 4. A visual control of the proper advance of the flexible fabric tube 4 is enabled by means of the inspection slit 30.

Handling with the different configuration sizes of the rotary drum 1 takes place in a uniform manner: the beginning of the flexible tube 4 is squeezed by the reversible head 28 in pressure sealed manner. FIG. 4 illustrates, how the compression-proof pipe conveyor 8 is connected to the rotary drum 1 through the flange 24 in pressure sealed manner. After closing all openings the pressure medium is supplied through a pressure port 16. The desired internal pressure is selected depending on the flexible tube diameter as well as the required radial stretching of the flexible tube 4. This pressure p prevailing both inside the rotary drum 1 and in the flexible tube conveyor 8. In the direction of the pipe 3, the pressurized space is limited by the squeezed flexible tube 4. By this pressure the turned up flexible tube 4 is forced deeper and deeper into the pipe 3. This results in unwinding the flexible tube 4 from the shaft 15. A constant advancing speed of the flexible tube 4 is aspired herein to avoid interferences such as by wrinkle formation.

The constant advancing speed does not arise oneself from the kinematics of the rotary drum 1. This is because of the friction moments acting in the shaft 15, which approximately remain the same during unwinding, however the radius of the flexible tube roll 31 and thus the torque by the drawing flexible tube 4 greatly decreases. As a result, with respect thereto the opposed force increases, which is generated by the friction moments and acting upon the unwound flexible tube 4. In order to achieve the desired constant advancing speed, hence braking on the shaft 15 during the initial phase and an additional acceleration during terminal phase are generally required. Admittedly, this can also be manually carried out, however, automated rotational speed control is advantageous. With the present rotary drum 1, braking and accelerating, respectively is carried out by the electric motor 18 which is connected to the shaft 15 via a V-belt 17. Hence, the control means 19 controls the electric motor 18. The basis thereto is the diameter of the flexible tube winding measured by the sensor 20. This sensor can be constructed, for example, as an ultrasonic sensor.

At the end of the unwinding operation the retaining belt 25 provides for a controlled terminal phase of pipe lining. The retaining belt 25 ensures, that advancing can be controlled by means of the rotational speed control on the shaft 15 even after unwinding the flexible tube 4, since it connects the end of the flexible tube 4 to the shaft 15.

We claim:

1. A method for lining a pipe or duct through a sealing internal lining of a plastic coated flexible tube adhering to the inner wall of said pipe or said duct by means of an adhesive, comprising the following steps:

filling a metered amount of adhesive into said flexible tube in uniform distribution over the flexible tube length, introducing the flexible tube into said pipe or said duct, wherein one end of the flexible tube is fastened to the rear end of said pipe or said duct with respect to the moving direction of the flexible tube, and the flexible tube is introduced into said pipe or said duct using a turning inside out operation such that the adhesive side of the flexible tube is pressed onto the inner pipe wall, and generating an internal pressure inside said introduced flexible tube by means of supplied water to maintain pressure of said flexible tube against the inner wall of said pipe until the adhesive between said flexible tube and the inner wall of said pipe is cured, wherein for accelerating the curing operation water is heated and cooled in controlled manner depending on the temperatures inside and outside of said pipe or said duct.

2. A method according to claim 1, wherein the water is heated and cooled depending on the difference of temperatures inside and outside of said pipe or said duct.

3. A method according to claim 1, wherein the water is conducted within a circuit including the flexible tube and a heating/cooling means.

4. A method according to claim 3, wherein the water is supplied and discharged at one side of said flexible tube such that the water flows through the flexible tube in a spatially separated manner in the opposite directions.

5. A method according to claim 1, wherein the temperature of the water inside said pipe or said duct is detected from the temperatures of the water streaming into said pipe or said duct and of the water discharging from said pipe or said duct.

6. A method according to claim 1, wherein at the beginning of the curing operation, water at the ambient temperature is supplied into said flexible tube to obtain the internal pressure.

7. A method according to claim 6, wherein the water inside said flexible tube is heated in a controlled manner at first starting from the ambient temperature depending on the temperatures inside and outside of said pipe or said duct, which is kept constant after reaching a predetermined temperature and finally after a predetermined time is cooled in a controlled manner with a constant temperature depending on temperatures inside and outside said pipe or said duct.

8. An apparatus for performing the method according to claim 1, in which a water circuit is formed with an internal flexible tube extending inside said flexible tube in the longitudinal direction thereof for separate direct flow of water through said flexible tube in both directions.

9. An apparatus according to claim 8, in which the internal flexible tube is formed as a retaining belt for introducing said flexible tube into said pipe or said duct.

10. A method according to claim 8, in which water inlet and outlet are located at the same end of the flexible tube.

11. An apparatus according to claim 8, in which a controllable heating/cooling means for the water is disposed inside the water circuit.

12. An apparatus according to claim 11, in which temperature sensors for the water entering into said flexible tube, water discharging from said flexible tube and for the surroundings of said pipe or said duct are connected to said control unit of the heating/cooling means.

13. An apparatus according to claim 11, in which the heating/cooling means is configured in mobile manner.

14. An apparatus according to claim 8, in which a flexible tube winding and unwinding rotary drum being pressurized with internal pressure is provided, which can be coupled to said pipe or said duct via a compression-proof flexible tube conveyor for receiving the portion of said flexible tube located between said rotary drum and said pipe or duct during introducing the flexible tube into said pipe or said duct.

15. An apparatus according to claim 14, in which said flexible tube conveyor can be uncoupled from said pipe or said duct after the completion of introducing the flexible tube, and subsequently said introduced flexible tube can be coupled into the water circuit.

16. An apparatus according to claim 8, in which a reversible head is provided for fastening one end of said flexible tube during turning up, with the reversible head can be coupled to said pipe or said duct.

17. An apparatus according to claim 16, in which the reversible head includes an inspection opening for monitoring the flexible tube during the introducing operation.

* * * * *